United States Patent
Shimshi et al.

(10) Patent No.: US 7,937,179 B2
(45) Date of Patent: May 3, 2011

(54) DYNAMIC INLINE YIELD ANALYSIS AND PREDICTION OF A DEFECT LIMITED YIELD USING INLINE INSPECTION DEFECTS

(75) Inventors: Rinat Shimshi, San Jose, CA (US); Youval Nehmadi, Sunnyvale, CA (US); Vicky Svidenko, San Jose, CA (US); Alexander T. Schwarm, Austin, TX (US); Sundar Jawaharlal, Glen Allen, VA (US)

(73) Assignee: Applied Materials, Inc., Santa Clara, CA (US)

( * ) Notice: Subject to any disclaimer, the term of this patent is extended or adjusted under 35 U.S.C. 154(b) by 285 days.

(21) Appl. No.: 12/154,459

(22) Filed: May 22, 2008

(65) Prior Publication Data
US 2008/0294281 A1   Nov. 27, 2008

Related U.S. Application Data

(60) Provisional application No. 60/931,725, filed on May 24, 2007.

(51) Int. Cl.
*G06F 19/00* (2006.01)
*G06F 17/50* (2006.01)
*H01L 21/66* (2006.01)
*G06K 9/00* (2006.01)

(52) U.S. Cl. .............. 700/110; 716/52; 716/55; 716/56; 716/136; 438/14; 382/145

(58) Field of Classification Search .................. 700/109, 700/110; 716/52, 55, 56, 136; 438/14; 382/145
See application file for complete search history.

(56) References Cited

U.S. PATENT DOCUMENTS

| | | | |
|---|---|---|---|
| 5,971,586 A * | 10/1999 | Mori | 700/108 |
| 6,311,139 B1 * | 10/2001 | Kuroda et al. | 702/81 |
| 6,389,323 B1 * | 5/2002 | Yang et al. | 700/110 |
| 6,393,602 B1 * | 5/2002 | Atchison et al. | 716/4 |
| 6,496,958 B1 * | 12/2002 | Ott et al. | 716/4 |
| 6,714,885 B1 * | 3/2004 | Lee | 702/84 |
| 6,901,564 B2 * | 5/2005 | Stine et al. | 716/56 |
| 6,948,141 B1 * | 9/2005 | Satya et al. | 716/52 |
| 7,174,521 B2 | 2/2007 | Stine et al. | |
| 7,280,945 B1 | 10/2007 | Weiner et al. | |
| 7,356,800 B2 | 4/2008 | Stine et al. | |
| 7,485,548 B2 * | 2/2009 | Deshmukh et al. | 438/460 |
| 7,570,796 B2 | 8/2009 | Zafar et al. | |
| 7,584,077 B2 | 9/2009 | Bergman et al. | |
| 7,673,262 B2 | 3/2010 | Stine et al. | |

(Continued)

OTHER PUBLICATIONS

Allan, Gerard A., "EYES User Manual," Predictions Software Ltd, Version 1.3, Nov. 18, 2002, 32 pages.
Allan, Gerard A., "PEYE-CAA User Manual," Predictions Software Ltd, Sep. 1, 2003, 17 pages.
Barberan, Sandrine, et al., "Management of Critical Areas and Defectivity Data for Yield Trend Modeling," Department of Device Engineering, STMicroelectronics-Central R&D, Crolles-France, Nov. 1998, 9 pages.

(Continued)

*Primary Examiner* — Albert Decady
*Assistant Examiner* — Sivalingam Sivanesan
(74) *Attorney, Agent, or Firm* — Blakely, Sokoloff, Taylor & Zafman LLP (57) ABSTRACT

In one embodiment, a method for predicting yield includes calculating a criticality factor (CF) for each of a plurality of defects detected in an inspection process step of a wafer, and determining a yield-loss contribution of the inspection process step to the final yield based on CFs of the plurality of defects and the yield model built for a relevant design. The yield-loss contribution of the inspection process step is then used to predict the final yield for the wafer.

19 Claims, 5 Drawing Sheets

U.S. PATENT DOCUMENTS

| | | | |
|---|---|---|---|
| 7,694,244 B2 | 4/2010 | Chan et al. | |
| 7,760,347 B2 | 7/2010 | Nehmadi et al. | |
| 2002/0143483 A1* | 10/2002 | Ono et al. | 702/83 |
| 2006/0277506 A1* | 12/2006 | Stine et al. | 716/4 |
| 2007/0052963 A1 | 3/2007 | Orbon et al. | |
| 2007/0061773 A1 | 3/2007 | Ye et al. | |
| 2007/0162242 A1* | 7/2007 | Singh et al. | 702/82 |
| 2007/0240085 A1 | 10/2007 | Bickford et al. | |
| 2008/0148216 A1 | 6/2008 | Chan et al. | |
| 2008/0163140 A1 | 7/2008 | Fouquet et al. | |
| 2008/0295048 A1 | 11/2008 | Nehmadi et al. | |
| 2009/0237104 A1* | 9/2009 | Tsuchida et al. | 324/765 |

OTHER PUBLICATIONS

Levasseru, Sandra, et al., "Application of a Yield Model Merging Critical Areas and Defectivity Data to Industrial Products," Defect and Fault Tolerance in VLSI Systems, Proceedings, 1997 IEEE International Symposium on Oct. 1997, pp. 11-19.

Svidenko, Vicky et al. "Dynamic Defect-Limited Yield Prediction by Criticality Factor," ISSM Paper: YE-O-157, 2007.

U.S. Appl. No. 12/154,458, Office Action dated Sep. 9, 2010.

* cited by examiner

DYNAMIC INLINE YIELD ANALYSIS AND PREDICTION OF A DEFECT LIMITED YIELD USING INLINE INSPECTION DEFECTS

RELATED APPLICATION

The present application claims priority to U.S. Provisional Application Ser. No. 60/931,725, filed May 24, 2007, which is incorporated herein in its entirety.

FIELD OF THE INVENTION

The present invention relates to product yield prediction and analysis, and more specifically to dynamic inline yield analysis and prediction.

BACKGROUND OF THE INVENTION

The fabrication of integrated circuits is an extremely complex process that may involve hundreds of individual operations. In view of the device and interconnect densities required in present day integrated circuits, it is imperative that the manufacturing processes be carried out with utmost precision and in a way that minimizes defects. For reliable operation, the electrical characteristics of the circuits must be kept within carefully controlled limits, which imply a high degree of control over the myriad of operations and fabrication processes. For example, in the photoresist and photomask operations, the presence of contaminants such as dust, minute scratches and other imperfections in the patterns on the photomasks can produce defective patterns on the semiconductor wafers, resulting in defective integrated circuits. Further, defects can be introduced in the circuits during the diffusion operations themselves.

The figure of merit of a semiconductor manufacturing facility is the sort yield obtained by electrically probing the completed devices. However, due to the multitude and complexity of process steps and their associated cost, it is desirable to detect problems early in the design phase in order to correct them, and to predict the yield in order to plan, during the manufacturing phase, wafer starts appropriately. Currently, designers use yield prediction software to decide which design layout alternative will produce a better yield, and thus be printed, and to decide how many wafers to put inline, i.e., adjust the number of wafer starts for production per product based on real inline data to meet the yielding die commitments.

During the design phase, existing software predicts yield based on the wafer design and fabrication defect data using a statistical critical area calculation. The problem with the existing yield prediction software lies in the hidden assumption that the defect distribution is random over the die and the likelihood of a defect to occur on different design elements is the same. With older technology nodes (90 nm and above), where most of the defects were actual random defects, these assumptions could hold true. However, with new technology nodes, where the number of systematic defects, i.e., defects due to non-random errors that are conditioned by the specifics of a design layout or the equipment, has increased significantly, the typical yield prediction software still distributes the defects randomly, even though the defects may occur in specific design elements.

During the manufacturing phase, one way to plan wafer starts appropriately is by utilizing inline inspection tools to detect process defects on the wafers in process. These tools are typically optical microscopes, but of late electron-beam inspection tools have been introduced for certain critical layers. The defects detected by inspection tools are referred to as 'visual defects'. Not all visual defects will cause an electrical fail. Conversely, not all yield loss can be attributed to visual defects. It has been a goal in the industry to be able to predict the yield loss due to visual defects. The methodology most commonly used is the Kill Ratio method that empirically deduces the fail probabilities of different defect classes by overlaying inline defects with sorted yield data. It is performed on an initial training set, and then applied to wafers in process. This method either requires significant manual classification for the learning set or relies on inspection tool classification that typically has low accuracy and purity. In addition, when new defect classes arise, the learning phase has to be repeated.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Embodiments of the invention provide a mechanism to dynamically predict a defect limited yield using inline inspection defects. The mechanism uses a criticality factor (CF) that indicates whether the defect is likely to cause a killer failure of the device. The CF is based on the critical area for a given defect size on the die layout in the vicinity of the reported defect location. The defect size reported by the inspection tool and the location of the defect defined by the inspection tool may not be absolutely accurate, introducing an uncertainty in the yield outcome. In addition, physical properties of the defects (such as conductivity), which are not characterized by optical inspection, may also affect the yield outcome and introduce an uncertainty in the yield outcome. The mechanism addresses the above uncertainties by adding an empirical learning phase that enables correlation of the calculated CF to the observed die yield. The correlation is updated dynamically and automatically and is constantly improved. The mechanism does not require any kind of manual classification or reliance on imperfect automatic classification.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
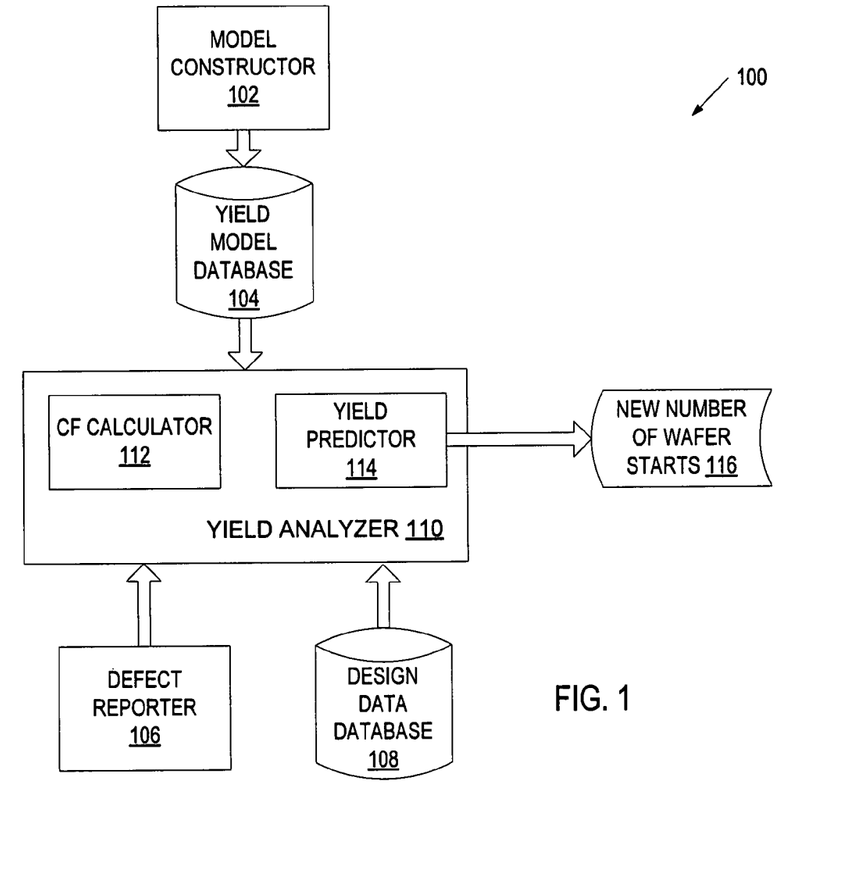
FIG. 1 is a block diagram of one embodiment of an inline yield prediction system.

FIG. 1 is a block diagram of one embodiment of a yield prediction system 100. The system 100 includes a model constructor 102, a yield model database 104, a design data database 108, a defect reporter 106, and a yield analyzer 110. The yield analyzer 110 may reside on the same computer as the other components of the system 100 or on a different computer than some or all of the other components and may communicate with the components residing on a different machine(s) via a network (e.g., a private network or a public network).

A wafer may be produced according to a design via a fabrication process controlled by a set of process parameters. The design data database 108 may store design data such as design layout, the routing information for the design layout, etc.

During the fabrication process, due to various factors, the wafers may not be formed to exactly match the design. Hence, to determine how the actual wafers vary from the design, one or more wafers undergo an inspection process at various steps during the fabrication process. The inspection process may be performed using any suitable inspection system, such as an UVision™ inspection system available from Applied Materials®. In some cases, the inspection process may be a separate process, and in other cases, it may be performed in conjunction (inline) with the fabrication process. As part of the inspection process, defects in the wafers are identified.

The defect reporter 106 provides geometric characteristics of the individual defects detected during different inspection process steps. The geometric characteristics may include, for example; the size of the defect, the volume of the defect, the location of the defect within the design on which the defect is found, etc. The defect reporter 106 may be part of a defect inspection system such as Dark Field, Bright Field or E-Beam inspection system.

The model constructor 102 is responsible for performing the learning phase during which it builds a yield model for a specific design. The yield model is built using a learning set that may include a set of dies for which there exist inspection results in all critical steps, as well as sort yield data. One embodiment of a method for building yield models will be discussed in more detail below. The yield models corresponding to different designs are stored in the yield model database 104.

The yield analyzer 110 predicts yield based on a Criticality Factor (CF) of individual defects detected at different process steps. The CF indicates whether a defect is likely to be a nuisance defect, or alternatively is likely to have a significant impact on yield. In particular, the CF represents a probability of a defect with certain geometric characteristics (e.g., size or volume) to kill a device. In one embodiment, the yield analyzer 110 includes a CF calculator 112 and a yield predictor 114. The CF calculator 112 calculates the CF of individual defects. The CF may be calculated based on the geometric characteristics of the defect and the layout of the design on which the defect is found. One embodiment of a method for calculating the CF will be discussed in more detail below in conjunction with FIG. 3.

The yield predictor 114 correlates CFs calculated for defects in a specific process step to the observed die yield provided by a yield model associated with a relevant design. The yield predictor 114 also calculates the yield-loss contribution of the specific process step to the final yield on that wafer using the correlated CFs. The yield-loss contribution can then be used to predict a final defect limited yield ("final yield"). Based on this prediction, the number of wafer starts can be adjusted, and the adjusted number 116 can be reported to corresponding manufacturing processes in the FAB.

Figure 2:
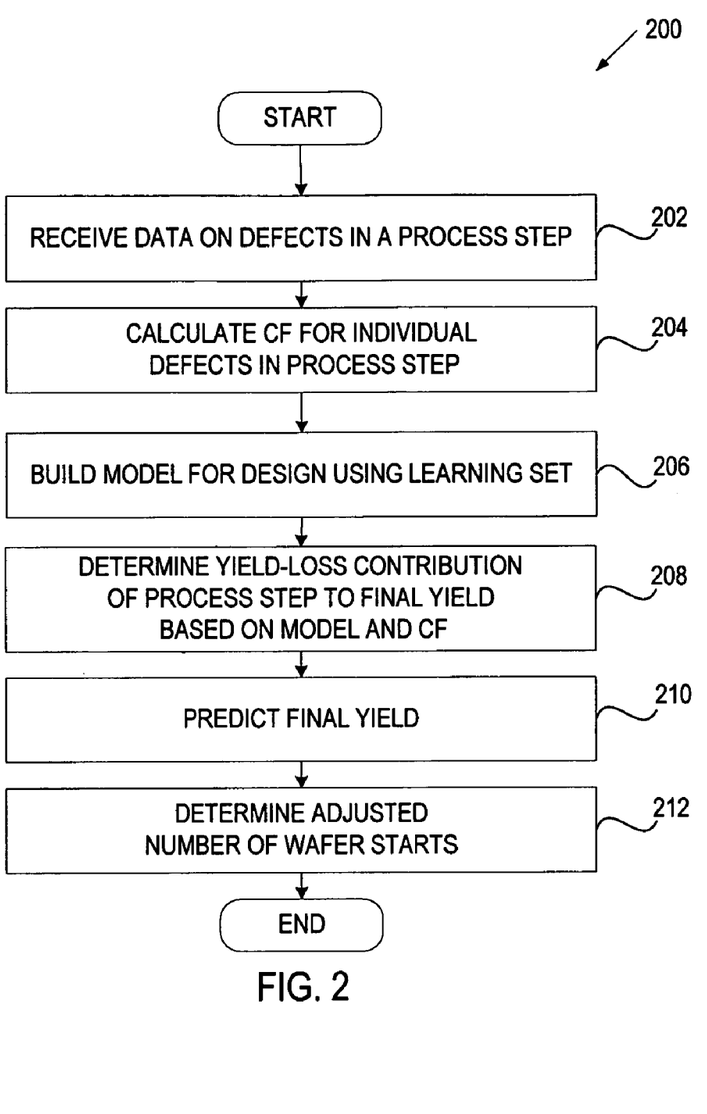
FIG. 2 is a flow diagram of one embodiment of a method for predicting a defect limited yield.

FIG. 2 is a flow diagram of one embodiment of a method 200 to predict defect limited yield based on inline inspection defects. The method may be performed by processing logic that may comprise hardware (e.g., circuitry, dedicated logic, programmable logic, microcode, etc.), software (such as instructions run on a processing device), or a combination thereof. In one embodiment, method 200 is performed by the yield prediction system 100 of FIG. 1.

At block 202, data pertaining to defects detected in an inspection step is received. The defects are detected in a specific inspection process step on a wafer having a particular design. The data may include, for example, the size or volume of the defects, the layout of the design in the vicinity of the reported defect locations, etc.

At block 204, the defects are binned together according to Criticality Factor (CF) values. Defects may be categorized into "bins" by CFs. Where defects have similar CFs, they are added to the same defect bin. A CF is calculated for each of the defects using the above defect data. The algorithm determines the CF, i.e., the probability of the defect to cause a killer failure of the device based on geometric considerations such as a likelihood of the defect to bridge two lines (cause a short circuit failure) and a likelihood of the defect to open a line (cause an open circuit failure).

As noted above, one of the weaknesses with existing yield prediction software is the hidden assumption that the defect distribution is random over the die and the likelihood of a defect to occur on different design elements is the same. To overcome this weakness, both random and systematic defects is considered in predicting the yield.

Defect phenomena are factors that affect yield and are usually classified as random defects or systematic defects. For example, yield can be affected by random defects such as extra material particles or missing material particles. Yield could also be affected by systematic defects, such as under-etching an isolated via (connector pad), the collapse of a photo-resist pattern, or erosion during chemical-mechanical planarization (CMP), etc.

Random defects are attributed to contamination of a wafer, e.g., the extra material particles or missing material particles. Systematic defects are due to non-random errors and are conditioned by the specifics of a design layout or the equipment, e.g., defects attributed to under-etching a via or collapsing a photo-resist pattern. Thus, systematic defects are strongly dependent on the design interactions (the relationship between design features and process parameters). As a consequence, systematic defects will occur in a very specific location or locations. This suggests that the CF approach for predicting fail probability of a defect might not work well for systematic defects.

Thus, prior to calculating the CF, the defects are separated into random defects and systematic defects and the systematic defects are excluded from the CF calculation.

Typically, the defects are hard to separate. However, using Design Based Binning (DBB), defects in fabrications of a wafer may be categorized as either systematic or random defects. In a patent application entitled "Design-Based Method for Grouping Systematic Defects in Lithography Pattern Writing System," publication number US20060269120A1, incorporated herein by reference, a method for grouping defects is described.

The location of the defects is determined on a wafer. By analyzing the layout in the neighborhood (the design layout in the area surrounding the defect) of the defect, and matching it to similar defected neighborhoods in different location across the die, defects may be categorized by common structures in which they occur. The inspection defects can be classified as random defects or systematic defects and the systematic defects may be excluded from the CF calculations.

Once the defects are separated, and the systematic defects excluded, the CF for each random defect detected in a process step is calculated. The CF of a defect is the probability to cause a killer failure based strictly on geometrical consideration: what is the likelihood of the defect to bridge (short) two lines, or to open a line. The CF values may be determined by using an exemplary CF calculation algorithm discussed in detail below in conjunction with FIG. 3.

At block 206, a yield model is built for a specific design using a learning set to correlate CF to sort yield. Had the defect location been known to absolute accuracy, and had geometrical considerations alone been sufficient to determine whether a fail occurred or not, then the yield outcome would be completely determinate. However, as noted above, the location inaccuracy of inspection tools can introduce an uncertainty that necessitates probability estimation. Moreover, physical properties of the defects (such as conductivity), which are not characterized by optical inspection, may affect the yield outcome and can introduce an uncertainty in the yield outcome even if the location was known to absolute accuracy. Therefore, in one embodiment, an empirical "learning" phase to correlate the calculated CF to the observed die yield is introduced to account for such uncertainties. The learning phase addresses the above uncertainties by correlating CF to sort yield using yield models.

A yield model provides quantitative characterization of the defect phenomenon in terms of probability of failure of a design (or some part of the design) under certain conditions. It allows a fail probability value to be attributed to a defect according to its CF using a learning set, i.e., a set of dies (presumably over multiple wafers) for which there are inspection results in all critical steps.

The yield model described here is constructed strictly for random visual defects. In one embodiment, by separating out the systematic visual defects using the DBB methodology mentioned above, the systematic visual defects are treated separately as discussed below.

For simplicity, in one embodiment, when building a yield model, it is assumed that there is no more than one defect per die. In another embodiment, a generalization to multiple defects per die is explained below.

As illustrated in the following exemplary expression, the final yield may comprise two components: (1) a visual defect component and (2) a non-defect component, each having a yield value and a yield-loss value associated with them (Y and YL respectively):

$$Y_{final} = Y_{non\text{-}defects} \cdot Y_{defects} \quad (1)$$

The random defects are distributed among S inspection steps. In each step the random defects are classified, according to similar CF values, into CF bins, $B_s$, each with $N_b$ defects. The classification may be represented in the following exemplary expression.

$$Y_{defects} = 1 - YL_{defects} \quad (2)$$
$$= \prod_{s=1}^{S} (1 - YL_{defects}^{s})$$
$$= \prod_{s=1}^{S} \prod_{b=1}^{B_s} (1 - YL_{defects}^{s,b})$$
$$= \prod_{s=1}^{S} \prod_{b=1}^{B_s} \prod_{n=1}^{N_b} (1 - YL_{defects}^{s,b,n})$$

Where $YL_{defects}^{s}$ is the yield-loss associated with step s defects, $YL_{defects}^{s,b}$ is the yield-loss associated with bin b defects in step s, and $YL_{defects}^{s,b,n}$ is the yield-loss associated with defect n in bin b in step s.

In the yield model, all defects within one bin have one fail probability value (and hence one yield-loss value) associated with them. Therefore Expression 2 can be rewritten in the following exemplary expression:

$$Y_{defects} = \prod_{s=1}^{S} \prod_{b=1}^{B_s} \left(1 - YL_{defects}^{s,b,n_0}\right)^{N_b} \quad (3)$$

As seen in the exemplary expression below, the yield-loss associated with defects of a certain class, ($YL_{defects}^{s,b}$), is the Fail Probability (FP), i.e., the probability of such a defect to cause an open or short failure, multiplied by the relative prevalence of such a defect among the dies:

$$YL_{defects}^{s,b} = FP_{defects}^{s,b} \times \frac{N_{s,b}}{N} \quad (4)$$

Where $FP_{defects}^{s,b}$ is the fail probability associated with bin b defects in step s, $N_{s,b}$ is the number of dies with bin b defects, and N is the number of all dies.

Inputting Expression 3 and Expression 4 into Expression 1, the final yield is represented by the following exemplary expression:

$$Y_{final} = Y_{non-defects} \cdot \prod_{s=1}^{S} \prod_{b=1}^{B_s} \left(1 - FP_{defects}^{s,b} \times \frac{N_{s,b}}{N}\right)^{N_b} \quad (5)$$

In order to predict the final yield (from Expression 5), the non-defect yield component ($Y_{non-defects}$) and defect-specific fail probability ($FP_{defects}^{s,b}$), are evaluated over all detected inline defects.

The evaluation is performed by using a learning set, i.e., a set of dies for which there are inspection results in all critical steps, and sort yield data. One embodiment of constructing a learning set is discussed in more detail below. The learning set is divided into two subsets "A," and "B." Subset A consists of dies from the learning set having no visual defects (henceforth, "Clean Dies"). Subset B consists of dies from the learning set having defects (henceforth, "Dirty Dies").

With respect to the non-defect yield component, ($Y_{non-defects}$), in Expression 1 ($Y_{final}=Y_{non-defects}\cdot Y_{defects}$) there is an implicit assumption that defect and non-defect yield defect phenomena arise completely independently of each other. Therefore, it may be assumed that the yield-loss for subset A, the clean dies, at any inspection step is due strictly to non-defect causes. As a result, the non-defect yield component is a constant value, c, represented in the exemplary expression below, in that it does not depend on any defect attributes.

$$Y_{non-defects} = \left(\frac{PassingCleanDies}{AllCleanDies}\right)_{SubsetA} = c \quad (6)$$

In the case of a subset B, the dirty dies, the yield may be attributed to both defect and non-defect causes, as seen in the following exemplary expression:

$$Y_{DirtyDies} = Y_{non-defects} \cdot Y_{defects} = c \cdot Y_{defects} = c \cdot (1 - YL_{defects}) \quad (7)$$

For example, where subset B has defects only in step s and those defects in subset B have a range of CF values, Expression 7 can be applied.

The dies in subset B can then be binned according to the CF value of their defects (e.g., divide the CF range into 10 equal bins of 0.1). The binning of the dies in subset B by CF value thus creates sub-subsets of subset B.

For example, one of the sub-subsets, "C," may consist of dies with defects only of CF bin b in step s (and no defects in any other step). Expression 7 would still apply to this new sub-subset. Moreover, for such a sub-subset, the yield-loss equals the fail probability since all of the dies in the sub-subset have only defects.

Expression 7, $Y_{DirtyDies}=Y_{non-defects}\cdot Y_{defects}=c\cdot Y_{defects}=c\cdot(1-YL_{defects})$, can then be solved for the fail probability attributed strictly to the defects in this subset using the following exemplary expression:

$$FP_{defects}^{s,b} = 1 - \frac{1}{c} \cdot Y_{DirtyDies}^{SubsetC} = 1 - \frac{1}{c} \cdot \frac{GoodDiesInSubsetC}{AllDiesInSubsetC} \quad (8)$$

If Expression 8 results in a negative number, then $FP_{defects}^{s,b}=0$.

Figure 4:
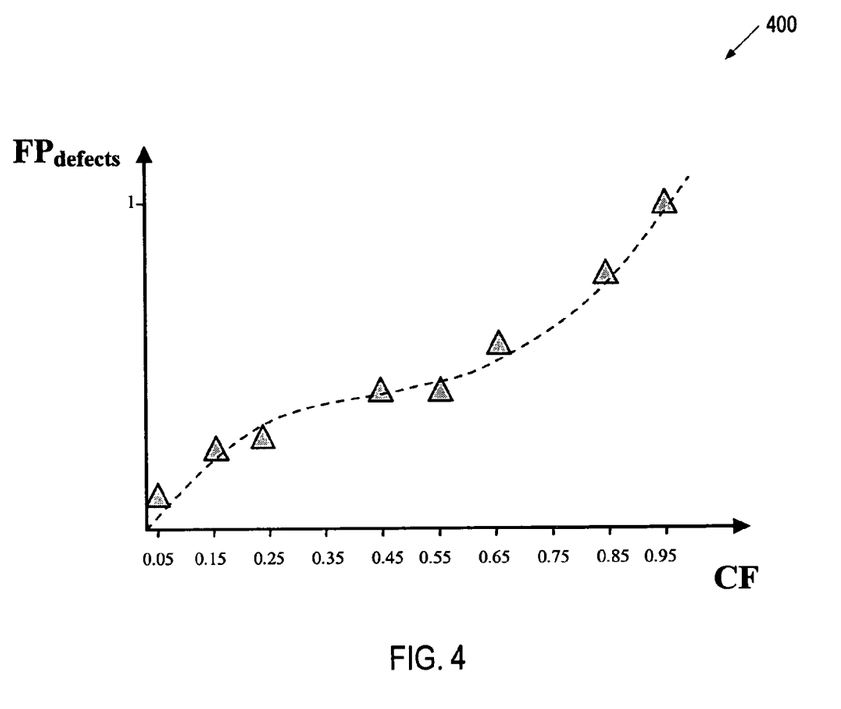
FIG. 4 is an exemplary graph illustrating a model for a process step.

For each of the remaining CF bin sub-subsets of subset B, the $FP_{defects}^{s,b}$ is calculated. The calculated results are plotted to a functional form $FP_{defects}=f(CF)$. FIG. 4 illustrates a schematic of the resulting graph for one inspection step.

The above operations are repeated for each of the critical inspection steps, thus building a yield model that allows a fail probability value to be attributed to a defect according to its CF using a learning set. The above correlations defined by the yield model can be used to predict yield for new incoming wafers throughout the process stack.

In regards to systematic defects, once a systematic defect is classified to a certain design-based bin, a fail probability value can be attributed to that bin by one of two methods:

1. Using a SEM (scanning electron microscope) review tool, a tool that enables engineers to image and classify defects, and manual classification of a significant sample of defects from that bin, a trained defect engineer is likely to predict, from a SEM image, if a defect will cause a failure or not, and thus estimate a fail probability for defects that fall into that systematic design bin.
2. As in the training set methodology outlined in this document, select a subset of dies that have only a particular class of defects at the relevant layer (and no defects in other layer), and determine the fail probability from sort yield. Expression (8) is used to separate out the non-defect-related fail probability.

At block 208, a yield-loss contribution of the process step to a final yield is determined based on the calculated CFs and the observed die yield provided by the yield model associated with a relevant design.

In one embodiment, the yield model is used to calculate the yield-loss contribution for a wafer that has performed up to inspection step s. The yield-loss contribution to the final yield for this wafer up to inspection step s can be calculated in the following exemplary expression:

$$YL_{defects}^{s} = 1 - \prod_{b=1}^{B_s} \left(1 - FP_{defects}^{s,b} \times \frac{N_{s,b}}{N}\right)^{N_b} \quad (9)$$

In practice, the correlation curve for step s in FIG. 4 may be examined, and the $FP_{defects}$ value may be extracted for each defect on the layer according to its CF value. The values and the defective die count per CF bin can then be input into Expression 9.

At block 210, the final yield is predicted using the yield-loss contribution. In predicting the final yield, Expression 5 is simplified to the following exemplary expression:

$$Y_{final} = c \cdot \prod_{s=1}^{S} \prod_{b=1}^{B_s} \left(1 - FP_{defects}^{s,b} \times \frac{N_{s,b}}{N}\right)^{N_b} \quad (10)$$

Wafers may be at different stages (i.e., steps) in the fabrication process. There are wafers that have reached the final critical inspection step, e.g., step S. There are also inline wafers, i.e., wafers that have not reached step S, but rather have completed only up to step M, where step M is a step before the final step S. Thus, predicting the final yield depends upon which step a wafer is located.

For a wafer that has gone through all the critical inspection steps, the final predicted yield may be calculated by inputting the appropriate $FP_{defects}$ for the defects (as obtained from the correlation curves) as well as the appropriate defective die count per CF bin.

For an inline wafer, an average yield-loss contribution is used to represent the not-yet completed steps, e.g., the steps between M and the final step S. Thus, for a wafer located at step M (where M<S), the final yield may be predicted using the following exemplary expression:

$$Y_{final} = c \cdot \prod_{s=1}^{M} \prod_{b=1}^{B_s} \left(1 - FP_{defects}^{s,b} \times \frac{N_{s,b}}{N}\right)^{N_b} \cdot \prod_{s=M+1}^{S} (1 - \langle YL_{defects}^{s}\rangle) \quad (11)$$

Where $\langle YL_{defects}^{s}\rangle$ is the representative value of the yield loss contribution for each step.

Note that the yield-loss contribution of the process step to a final yield determined at block 208 can be used in two ways: (a) for trending/monitoring and to capture baseline yield drifts (and limit major yield excursions) due to defects early in the process, and (b) to obtain representative values of the yield loss contribution for each step (this can be an average value, $\langle YL_{defects}^{s}\rangle$, over some historical time span). Thus, $\langle YL_{defects}^{s}\rangle$ can be calculated using the yield-loss contribution of the process step to a final yield.

Note, in one embodiment, the "fundamental unit" of yield-loss is a single defect. In another embodiment, there is more than one defect per die, especially for large dies. Where there is more than one defect per die, all of the defects that fall into one die are aggregated into one virtual defect.

For each virtual defect an aggregated CF value is calculated using the following exemplary expression:

$$CF_{die} = 1 - \prod_{i=1}^{DefectsPerDie} (1 - CF_i) \quad (12)$$

This calculation may be performed in both the learning phase and in the yield prediction phase.

At block 212, an adjusted number of wafer starts is determined based on the predicted yield.

Figure 3:
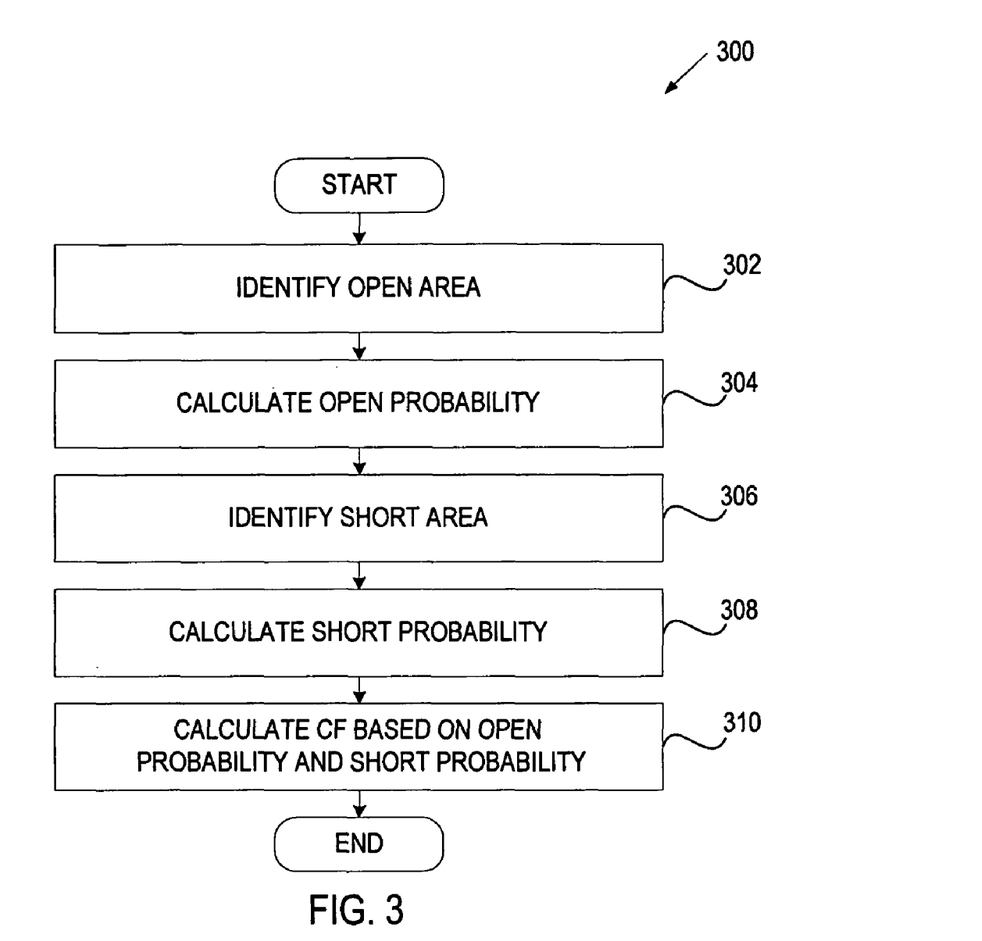
FIG. 3 is a flow diagram of one embodiment of a method for calculating a defect criticality factor.

FIG. 3 is a flow diagram of one embodiment of a method for calculating a defect Criticality Factor (CF). The method may be performed by processing logic that may comprise hardware (e.g., circuitry, dedicated logic, programmable logic, microcode, etc.), software (such as instructions run on a processing device), or a combination thereof. In one embodiment, method 300 is performed by the yield prediction system 100 of FIG. 1.

In FIG. 3, an open area is identified (block 302) and a probability of the defect to cause an open failure (open probability) is calculated (block 304). The open area is the total area of all locations inside the design layout area, in which the defect would cause an opening failure. Open probability may be calculated as a ratio between the open area and the design layout window defined by the location inaccuracy of the inspection tool.

At block 306, a short area is identified. The short area is the total area of all locations inside the design layout area, in which the defect would cause a shorting failure. At block 308, a probability of the defect to cause a shorting failure (short probability) is calculated. Short probability may be calculated as a ratio between the short area and the entire design layout area.

At block 310, a CF is calculated as a kill ratio of the defect considering both open probability and short probability. For example, the CF can be calculated using the following exemplary expression:

$$Cf=1-(1-Ps)\times(1-Po).$$

One embodiment of constructing a learning set will now be discussed. A learning set is a set of representative wafers having inspection data at all critical layers, and die sort data (i.e., pass, fail). The defect data should be of adders only, i.e., only the defects that originate for the first time in the specific inspected layer are included. Each die in this learning set is identified by a die ID. An exemplary learning set is illustrated in the following table:

|  | $Die_1$ | $Die_2$ | $Die_3$ | $Die_4$ ... | $Die_K$ |
|---|---|---|---|---|---|
| $Step_1$ | $CF_{1,1}$ | ND | $CF_{3,1}$ | ND | $CF_{N,1}$ |
| $Step_2$ | ND | ND | ND | ND | ND |
| $Step_3$ ... | $CF_{1,3}$ | $CF_{2,3}$ | ND | ND | ND |
| $Step_N$ | ND | ND | ND | ND | $CF_{K,N}$ |
| Sort | Fail | Pass | Fail | Fail | Pass |

Each column contains information for a different die. Each row, with the exception of the last row, contains information for a different inspection step. The table is populated by the calculated CF values for defects that fell in a certain die at a certain step. If more than one defect falls in a die at a certain step, the aggregated die CF may be used as outlined in Expression 12, $$CF_{die} = 1 - \prod_{i=1}^{DefectPerDie} (1 - CF_i).$$

If no defects were detected on a certain die at a certain step, ND, (denoting No Defects) may be entered. Note the case where no defects were detected on a certain die at a certain step is distinguished from the case in which a defect occurred with CF=0, i.e., when the defect is smaller than the smallest critical dimension in the layout window. The last row of the table contains the sort data for each die.

The non-defect yield component from a subset of clean dies is then calculated, using Expression 6, $$Y_{non-defects} = \left(\frac{PassingCleanDies}{AllCleanDies}\right)_{SubsetA} = c.$$

From the above table, correlation curves for each inspection step may be constructed as follows:
1. Only dies with defects (and hence CF values) in the current layer alone are considered. In the example table above, for $Step_1$ only $Die_3$ can be considered.
2. The considered dies are sorted into bins according to their CF values. The guideline is to divide CF into 10 bins (0-0.1; 0.1-0.2; 0.2-0.3; . . . ; 0.9-1.0)
3. For each bin the defect-caused fail probability is calculated from Expression 8, $$FP_{defects}^{s,b} = 1 - \frac{1}{c} \cdot Y_{DirtyDies}^{SubsetC} = 1 - \frac{1}{c} \cdot \frac{GoodDiesInSubsetC}{AllDiesInSubsetC}$$

4. For each step a scatter plot is constructed where the Y axis is $FP_{defects}^s$ and the X axis is the center value of the CF bin (e.g., 0.05; 0.15; . . . ; 0.95)
5. The points are fit to a functional form. Alternatively, a lookup table (LUT) can be constructed.

The learning set may be constantly updated with new data resulting in more refined CF correlation curves and non-defect yield components. The following are guidelines for a minimum learning set size:
1. For each critical layer, at least 5 CF bins have data points
2. Each CF bin data point is a result of at least 10 die (combined pass and fail)
3. There are at least 50 die with no defects at any layer for c calculation The yield calculation is done as follows:
From Expression 1 $Y_{defects}$ is now split into a random defect component and a systematic defect component as seen in the following exemplary expression:

$$Y_{defects} = Y_{sys} \cdot Y_{ran} \quad (13)$$

$Y_{ran}$ is calculated as outlined above for all random defects in all inspected layers. $Y_{sys}$ may be calculated using the following exemplary expression for all systematic defects in all inspected layers (this is equivalent to Expression 10 for random defects):

$$Y_{sys} = \prod_{s=1}^{S} \prod_{k=1}^{K_s} \left(1 - FP_{defects}^{s,k} \times \frac{N_{s,k}}{N}\right)^{N_k} \quad (14)$$

Figure 5:
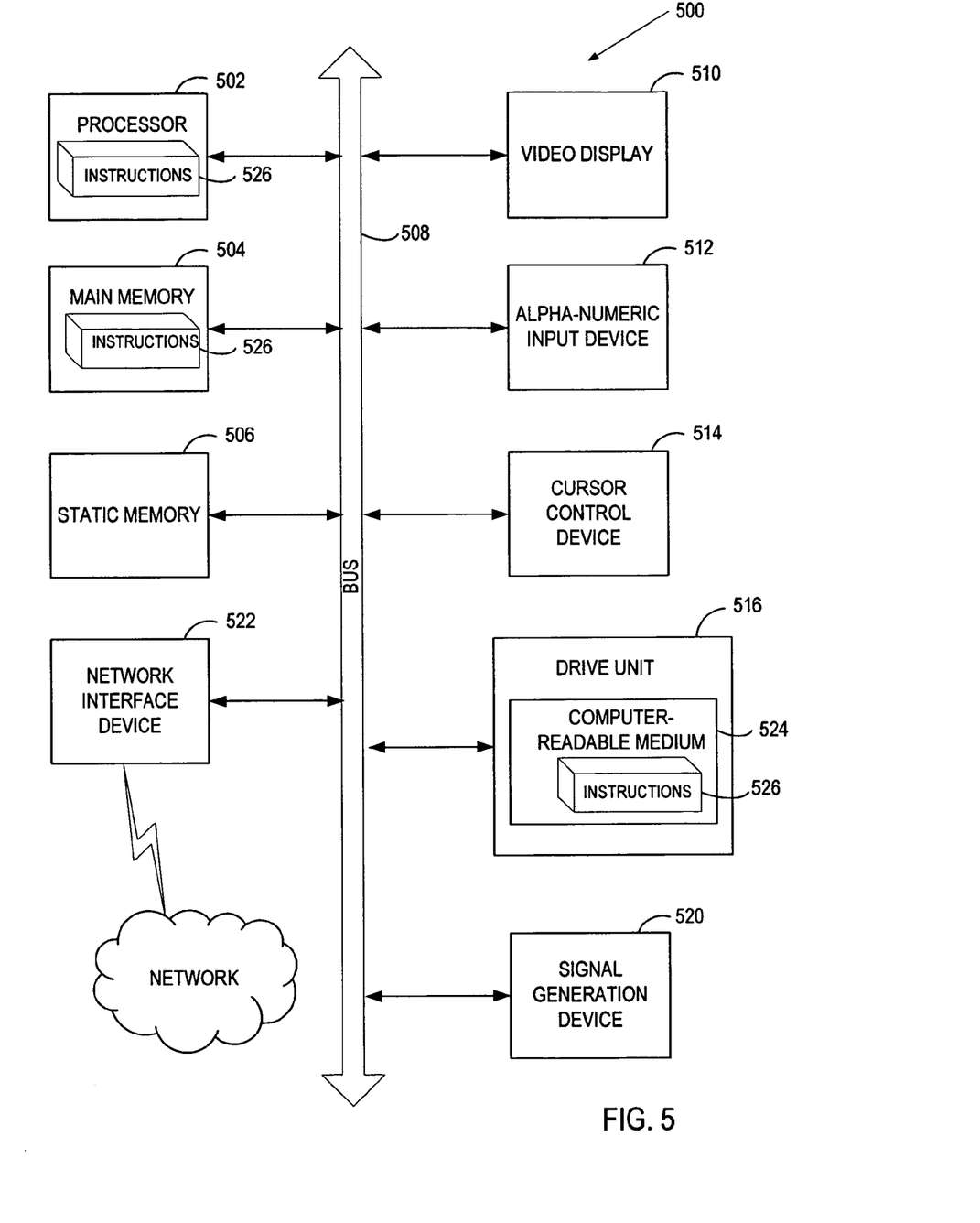
FIG. 5 illustrates an exemplary computer system.

Where:
s is the step index and S is the total number of critical inspection steps.
k is the systematic bin index and $K_s$ is the total number of unique systematic bins with associated defects in step s.
$FP_{defects}^{s,k}$ is the fail probability value for systematic bin k, as obtained from one of the two methods outlined above.
$N_k$ is the number of systematic defects belonging to systematic bin k in step s.
$N_{s,k}$ is the number of dies in step s with defects of systematic bin k.
N is the total number of dies FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    calculating, using a computer, a criticality factor (CF) for each of a plurality of defects detected in at least one inspection process step of a wafer, the wafer comprising a plurality of dies;
    determining a non-defect yield component of a final yield for the wafer using a subset of the plurality of dies that have no visual defects;
    determining a yield-loss contribution of the inspection process step to the final yield based on the CFs of the plurality of defects, a yield model built for a relevant design, and the non-defect yield component; and
    predicting the final yield for the wafer using the yield-loss contribution of the inspection process step.

2. The computer-implemented method of claim 1, further comprising determining an adjusted number of wafer starts based on the predicted final yield.

3. The computer-implemented method of claim 1, further comprising building the yield model for the relevant design by:
    distributing defects among a number of inspection steps; and
    for each step:
        classifying the defects according to similar CF values into one or more CF bins;
        creating a second subset of dies from the subset of the plurality of dies, wherein the subset is a set of dies having inspection results in all inspection steps, wherein the second subset is a set of dies having defects only in a specific inspection step;
        binning together the dies in the second subset according to a similar CF value to create one or more sub-subsets;
        for each sub-subset, calculating a defect-specific fail probability ($FP_{defects}^{s,b}$); and
        plotting the defect-specific fail probability in a functional form, $FP_{defects}=f(CF)$, to create a correlation curve.

4. The computer-implemented method of claim 3, wherein calculating the defect-specific fail probability ($FP_{defects}^{s,b}$) for each sub-subset is calculated as:

$$FP_{defects}^{s,b} = 1 - \frac{1}{c} \cdot Y_{DirtyDies}^{SubsetC} = 1 - \frac{1}{c} \cdot \frac{GoodDiesInSubsetC}{AllDiesInSubsetC}.$$

5. The computer-implemented method of claim 4, wherein c is a constant value representing the non-defect yield component for the subset of dies having no visual defects calculated as a ratio of passing dies having no visual defects to all dies having no visual defects.

6. The computer-implemented method of claim 1, wherein calculating the CF comprises:
    identifying an open area, wherein the open area is a total area of all locations inside a design layout area to cause an open failure, and identifying a short area, wherein the short area is a total area of all locations inside the design layout to cause a short failure; and
    calculating a probability of the defect to cause an open failure and a probability of the defect to cause a short failure.

7. The computer-implemented method of claim 6, wherein the probability of the open failure is a ratio between the open area and a design layout window defined by a location inaccuracy of an inspection tool.

8. The computer-implemented method of claim 6, wherein the probability of the short failure is a ratio between the short area and the entire design layout area.

9. The computer-implemented method of claim 1, wherein determining the yield-loss contribution of the process step to the final yield comprises:
    for each defect on an inspected layer, extracting the defect-specific fail probability value ($FP_{defects}$) from a correlation curve corresponding to the step; and
    computing the yield-loss contribution to final yield as:

$$YL_{defects}^{s} = 1 - \prod_{b=1}^{B_s} \left(1 - FP_{defects}^{s,b} \times \frac{N_{s,b}}{N}\right)^{N_b}.$$

10. The computer-implemented method of claim 1, wherein predicting the final yield for a wafer that has completed all inspection process steps comprises:
    using the defect-specific fail probability value ($FP_{defects}$) from the correlation curve and a defective die count per CF bin to compute the final yield as:

$$Y_{final} = c \cdot \prod_{s=1}^{S} \prod_{b=1}^{B_s} \left(1 - FP_{defects}^{s,b} \times \frac{N_{s,b}}{N}\right)^{N_b}.$$

11. The computer-implemented method of claim 1, wherein predicting the final yield for an inline wafer comprises:
    using the defect-specific fail probability value ($FP_{defects}$) from the correlation curve and a defective die count per CF bin to compute the final yield as:

$$Y_{final} = c \cdot \prod_{s=1}^{M} \prod_{b=1}^{B_s} \left(1 - FP_{defects}^{s,b} \times \frac{N_{s,b}}{N}\right)^{N_b} \cdot \prod_{s=M+1}^{S} (1 - \langle YL_{defects}^{s}\rangle)$$

where $\langle YL_{defects}^{s}\rangle$ is an average yield-loss contribution over a historical time span.

12. The computer-implemented method of claim 1, wherein there is more than one defect per die, further comprising:
   aggregating all of the defects in a die into a virtual defect; and
   for each virtual defect, calculating an aggregated CF value as:

$$CF_{die} = 1 - \prod_{i=1}^{DefectsPerDie} (1 - CF_i).$$

13. A computer-implemented system comprising:
   a memory;
   processor coupled to the memory;
   a model constructor executed from the memory by the processor to build a yield model for a design; and
   a yield analyzer, coupled to the model constructor, to calculate a criticality factor (CF) for each of a plurality of defects detected in at least one inspection process step of a wafer, the wafer comprising a plurality of dies, to determine a non-defect yield component of a final yield for the wafer using a subset of the plurality of dies that have no visual defects, to determine a yield-loss contribution of the inspection process step to the final yield based on the built yield model and the criticality factors calculated for individual defects detected at different process steps, and the non-defect yield component, and to predict the final yield for the wafer using the yield-loss contribution.

14. The computer-implemented system of claim 13, wherein the yield analyzer comprises:
   a CF calculator, to calculate the CFs of the individual defects; and
   a yield predictor, to calculate the yield-loss contribution of an inspection process step to a final yield using the CFs.

15. The computer-implemented system of claim 14, wherein the yield-loss predictor to calculate the yield-loss contribution of the inspection process step to the final yield comprises correlating the CFs calculated for the defects in a specific process step to an observed die yield provided by the yield model.

16. The computer-implemented system of claim 13, further comprising:
   a yield model database, coupled to the model constructor, to store the yield model;
   a design data database, coupled to the yield analyzer, to store design data, wherein the design data includes at least one of design layouts and routing information for the design layouts; and
   a defect reporter, coupled to the yield analyzer, to provide geometric characteristics of individual defects detected during different process steps.

17. The computer-implemented system of claim 13, wherein the CFs are calculated based on at least one of: a size of the defect, a volume of the defect, and a layout of the design on which the defect is found.

18. The computer-implemented system of claim 13, wherein to build a yield model for a design uses sort yield data and the subset comprising a set of dies having inspection results for all critical process steps.

19. A non-transitory computer readable storage medium, comprising executable instructions which when executed on a processing system cause the processing system to perform a method comprising:
   calculating a criticality factor (CF) for each of a plurality of defects detected in an at least one inspection process step of a wafer, the wafer comprising a plurality of dies;
   determining a non-defect yield component of a final yield for the wafer using a subset of the plurality of dies, wherein the subset of dies has no visual defects;
   determining a yield-loss contribution of the inspection process step to the final yield based on CFs of the plurality of defects, a yield model built for a relevant design, and the non-defect yield component; and
   predicting the final yield for the wafer using the yield-loss contribution of the inspection process step.

\* \* \* \* \*